(12) United States Patent
Gentilin et al.

(10) Patent No.: US 9,946,337 B2
(45) Date of Patent: Apr. 17, 2018

(54) UTILIZING INERTIAL MEASUREMENT UNIT DATA OF A HEAD MOUNTED DISPLAY DEVICE TO GENERATE INFERRED COMFORT DATA

(71) Applicant: Immersv, Inc., Palo Alto, CA (US)

(72) Inventors: John Charles Gentilin, Castro Valley, CA (US); Mihir Shah, Palo Alto, CA (US); Marc Anthony Bourget, San Francisco, CA (US); Jonathan Linsner, San Leandro, CA (US)

(73) Assignee: Immersv, Inc., Emeryville, CA (US)

( * ) Notice: Subject to any disclaimer, the term of this patent is extended or adjusted under 35 U.S.C. 154(b) by 0 days.

(21) Appl. No.: 15/219,175

(22) Filed: Jul. 25, 2016

(65) Prior Publication Data

US 2018/0024625 A1    Jan. 25, 2018

(51) Int. Cl.
G06F 3/00       (2006.01)
G06F 3/01       (2006.01)
G06T 19/00      (2011.01)
G09G 5/00       (2006.01)
G06F 3/0346     (2013.01)

(52) U.S. Cl.
CPC ............ G06F 3/012 (2013.01); G06F 3/0346 (2013.01); G06T 19/006 (2013.01); G09G 5/003 (2013.01)

(58) Field of Classification Search
CPC ..... G06T 19/006; G06F 3/012; G06F 3/0346; G09G 5/003
See application file for complete search history.

(56) References Cited

U.S. PATENT DOCUMENTS

| | | | |
|---|---|---|---|
| 2011/0267321 A1* | 11/2011 | Hayakawa | G02B 27/0093 345/204 |
| 2013/0174213 A1* | 7/2013 | Liu | G02B 27/017 726/1 |
| 2016/0228771 A1* | 8/2016 | Watson | G06F 3/013 |
| 2017/0203213 A1* | 7/2017 | Stafford | A63F 13/533 |

* cited by examiner

*Primary Examiner* — Muhammad N Edun
(74) *Attorney, Agent, or Firm* — Elliot H. Karlin; Hickman Palermo Becker Bingham LLP

(57) ABSTRACT

A method and apparatus for utilizing an inertial measurement unit and one or more additional sensors on a head mounted display is provided. In an embodiment, a head mounted display system sends inertial measurement unit data and head mounted display removal data to a tracking computing device. The tracking computing device identifies a time of removal of the head mounted display from the head of the user and stores a portion of the inertial measurement unit data corresponding to the time of removal of the head mounted display from the head of the user. Based on the stored portion of the inertial measurement unit data, the tracking computing device determines a state of the user of the head mounted display system at the time of removal.

16 Claims, 5 Drawing Sheets

UTILIZING INERTIAL MEASUREMENT UNIT DATA OF A HEAD MOUNTED DISPLAY DEVICE TO GENERATE INFERRED COMFORT DATA

FIELD OF THE DISCLOSURE

The present disclosure generally relates to the field of computer-based virtual reality systems and applications. Specifically, the present disclosure relates to digitally programmed logic for combining sensory data indicating a removal of a head mounted display device from a head of a user with inertial measurement unit data indicating acceleration and angular rate of change of the head mounted display device to generate inferred comfort data that is useful in modifying the virtual reality applications that generated displays resulting in the data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based virtual reality devices provide a unique immersive experience for a user. Through virtual reality applications, a user is capable of experiencing a fully modeled three dimensional world of a game or movie as if the user was actually in the game or movie. Virtual reality computer systems typically comprise a programmed digital computer coupled, directly or indirectly via networks, to a display device that is capable of rendering a virtual 3D world or environment on a two-dimensional display panel. In some cases the display device may be a head mounted display (HMD) consisting of a wearable apparatus having one or more displays that can be positioned close to the eyes of the user.

HMDs provide an immersive virtual reality experience for a user. Immersion in the visual experience is achieved in part because the HMD displays video across the entire frontal and peripheral visual field of the user so that the real external environment is not seen. An HMD creates the immersive feel by allowing an application publisher to provide a hands free immersion into video games or 3D filmed content. By tracking the movement of the headset in three dimensions through one or more motion detecting chips, an HMD is capable of displaying the 3D environment in a manner that synchronizes with the motion of a person's head. Thus, as a person turns or rotates their head, the headset is capable of recognizing the motion and displaying to the user a corresponding portion of the virtual reality environment.

Unfortunately, some virtual reality environments can have the effect of discomfort on the user after a period of time. For example, the inventors have found that the use of some third party virtual reality environments with immersive HMDs, for periods as short as 20 minutes, can cause discomforting effects such as disorientation, nausea, and fatigue for periods of several hours after use of the virtual reality experience ends. As virtual reality applications become more available to the public, it becomes more important for publishers of virtual reality environments to understand when and how their software, applications and environments are causing discomfort among users.

SUMMARY

The appended claims may serve to summarize the present disclosure.

DETAILED DESCRIPTION

Figure 1:
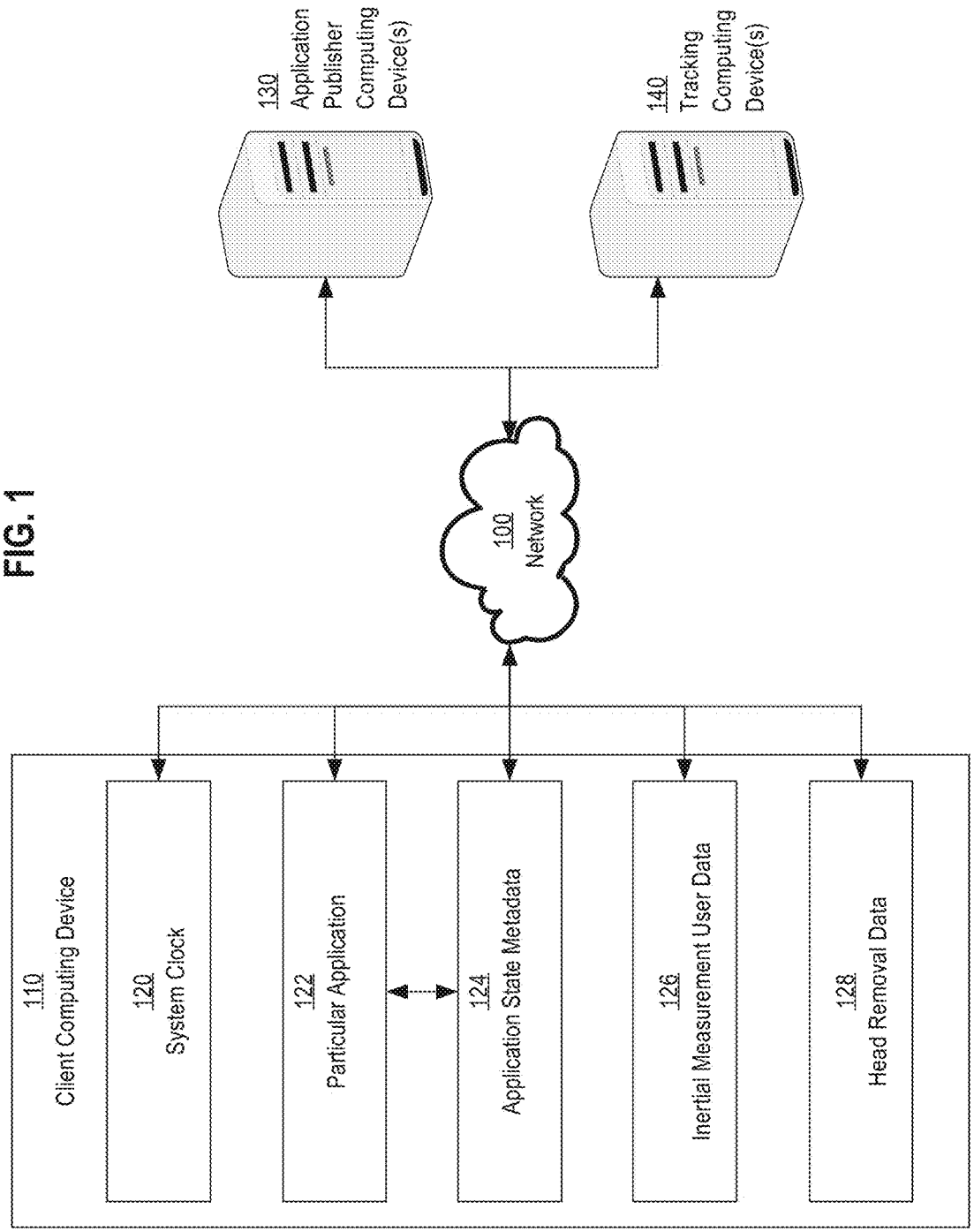
FIG. 1 illustrates an example network upon which embodiments may be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

1. General Overview

Maintaining user comfort in a virtual reality experience or environment that is obtained through the use of a virtual reality computer program application has become a significant issue. Many virtual reality environments are supported via the internet, using computer-implemented techniques in which a server computer stores, for downloading to client computers, sets of instructions that the client computers can use to render a virtual reality environment, provide a virtual reality game, or provide other virtual reality experiences. Because the inherent nature of virtual reality application programs means that the publishers of virtual reality environments are separated from client computers, head-mounted displays, and end users by the internet, the publishers face an internet-specific problem of how to obtain meaningful data about the level of user comfort during a particular virtual reality experience, and also how to concurrently obtain information about a virtual position, location, level or other state of the client computers, head-mounted displays, and end users at the time that an event of comfort or discomfort occurred. Obtaining such data may be important in modifying or updating VR application programs to reduce the effects of discomfort.

Aspects of the disclosure generally relate to computer implemented techniques for inferring comfort data values or levels based on other data corresponding to the removal of a head mounted display system. According to an embodiment, a head mounted display system comprising an inertial measurement unit and one or more sensors that are configured to detect proximity of the head mounted display system to the head of a user. The head mounted display system executes a virtual reality application. The head mounted display system sends inertial measurement unit data and head mounted display removal data to a tracking computing device. Based on the inertial measurement unit data and the head mounted display removal data, the tracking computing device determines a state of the user at the time of the head mounted display removal. State, in this sense, as further described in other sections herein, may refer to a virtual position of the user within the environment, a virtual level that the user has reached in the VR application, and other indications of what the user was doing, or where the user was located logically or geographically with respect to the VR application, at the time of the head mounted display removal.

In an embodiment, a computer implemented method comprises receiving, from a first head mounted display system comprising an inertial measurement unit and a removal sensor, a stream of inertial measurement unit data indicating acceleration and angular rate of change of the first head mounted display system; receiving, from the first head mounted display system, head mounted display removal data indicating removal of the first head mounted display system from the head of a user; identifying a time of removal of the first head mounted display from the head of the user based on the head mounted display removal data; identifying and storing a portion of the stream of inertial measurement unit data corresponding to the time of removal of the first head mounted display from the head of the user; based, at least in part, on the stored portion of the inertial measurement unit data, determining a particular end state of the user of the first head mounted display at the time of removal.

2. Structural Overview

FIG. 1 illustrates an example network upon which embodiments may be implemented. FIG. 1 comprises client computing device 110, application publisher computing device(s) 160, virtual reality content management system 170, and content provider server(s) 180, which are communicatively coupled over network 100.

Network 100 may be implemented by any medium or mechanism that provides for the exchange of data between the various elements of FIG. 1. Examples of network 100 include, without limitation, one or more networks, such as one or more Local Area Networks (LANs), one or more Wide Area Networks (WANs), one or more Ethernets or the Internet, or one or more terrestrial, satellite or wireless links. For purposes of illustrating a clear example, network 100 is shown as a single element, but in practice network 100 may comprise one or more local area networks, wide area networks, and/or internetworks. The various elements of FIG. 1 may also have direct (wired or wireless) communications links, depending upon a particular implementation.

Each of client computing device 110, application publisher computing device(s) 130 and tracking computing device(s) 140 may be implemented using a server-class computer or other computer having one or more processor cores, co-processors, or other computers. FIG. 1 depicts client computing device 110, application publisher computing device(s) 130 and tracking computing device(s) 140 as distinct elements for the purpose of illustrating a clear example. However, in other embodiments more or less server computers may accomplish the functions described herein. For example, tracking computing device(s) 140 may interact with a plurality of application publisher computing devices 130 and/or a plurality of client computing devices 110. As another example, a single server computer may perform the functions of application publisher computing device(s) 130 and tracking computing device(s) 140. Additionally, application publisher computing device(s) 130 may be one or more of a smart phone, PDA, tablet computing device, laptop computer, desktop computer, workstation, or any other computing device capable of transmitting and receiving information and performing the functions described herein.

Client computing device 110 may be any computing device that is capable of displaying a virtual reality environment and interacting over a network with tracking computing device(s) 140. Client computing device may be a smart phone, personal computer, tablet computing device, PDA, laptop, or any other computing device capable of transmitting and receiving information and performing the functions described herein. In an embodiment, client computing device 110 is a head mounted display for displaying virtual reality applications. Additionally and/or alternatively, client computing device 110 may be communicatively coupled to a head mounted display for displaying virtual reality applications. For example, a head mounted display may be communicatively coupled to a personal computer which performs the receiving and transmitting functions described herein and further causes displaying, through the head mounted display, a virtual reality application. As used herein, a head mounted display refers to a device comprising a screen that is configured to be paired with the face of a user.

In an embodiment, client computing device 110 contains system clock 120. Client computing device 110 may be configured to access system clock 120 to identify a current time during execution of a particular application. While system clock 120 may not be synchronized with the world clock, system clock 120 may be configured to be internally consistent such that times retrieved from system clock 120 may be used to identify points in a data stream sent, received, and or stored on client computing device 110.

In an embodiment, client computing device 110 executes a particular application 122, which may be a virtual reality display, virtual reality game, modified reality display, modified reality game, 360 degree video, or 3D video, as some examples. Client computing device 110 may receive particular application 122 from application publisher computing device(s) 160 over network 100. Additionally and/or alternatively, particular application 122 may execute on client computing device 110 from one or more computer readable media storing instructions which, when executed by client computing device 110, cause client computing device 110 to execute the particular application.

In an embodiment, client computing device 110 stores application state metadata 124. Application state metadata 124 includes metadata names that define attributes or elements of the state of particular application 122 and one or more associated metadata values for each of the metadata names. Application state metadata 124 may be retrieved from particular application 122 periodically or at specific times, such as when particular application 122 is terminated.

In an embodiment, client computing device stores inertial measurement unit data 126. Inertial measurement unit data 126 may be retrieved from an inertial measurement unit on client computing device 110. The inertial measurement unit on client computing device 110 may comprise one or more accelerometers, gravimeters, magnetometers, gyroscopes, and/or other sensors. The inertial measurement unit may produce inertial measurement unit data 126 which describes the position, acceleration, and/or angular rate of change of client computing device 110.

In an embodiment, client computing device 110 stores head mounted display removal data 128. Head mounted display removal data 128 may be retrieved from one or more head mounted display removal sensors on client computing device 110. The one or more head mounted display removal sensors may include pressure sensors and/or light sensors which are configured to detect whether the head mounted display is incident with the head of the user. Head mounted display removal data 128 may include data which indicates that the device was incident with the head of the user and ceased being incident with the head of the user. Head mounted display removal data 128 may also include a time retrieved from system clock 120 associated with the head mounted display removal.

Application publisher computing device(s) 130 is communicatively coupled to tracking computing device(s) 140 via one or more networks, which may be implemented in the manner previously described for network 100. Application publisher computing device(s) 130 may be configured to send data identifying metadata names to tracking computing device(s). Application publisher computing device(s) may be further configured to provide particular application 122 to client computing device 110 over network 100.

Tracking computing device(s) 140 is communicatively coupled to application publisher computing device(s) 130 and client computing device(s) 110. Tracking computing device(s) 140 may be configured to generate instructions that cause a client computing device to send head mounted display removal data, inertial measurement unit data, and application state data to tracking computing device(s) 140. Tracking computing device(s) 140 may also be configured to perform data analytics to compute end user states and correlate said end user states with particular applications and particular metadata values.

Figure 2:
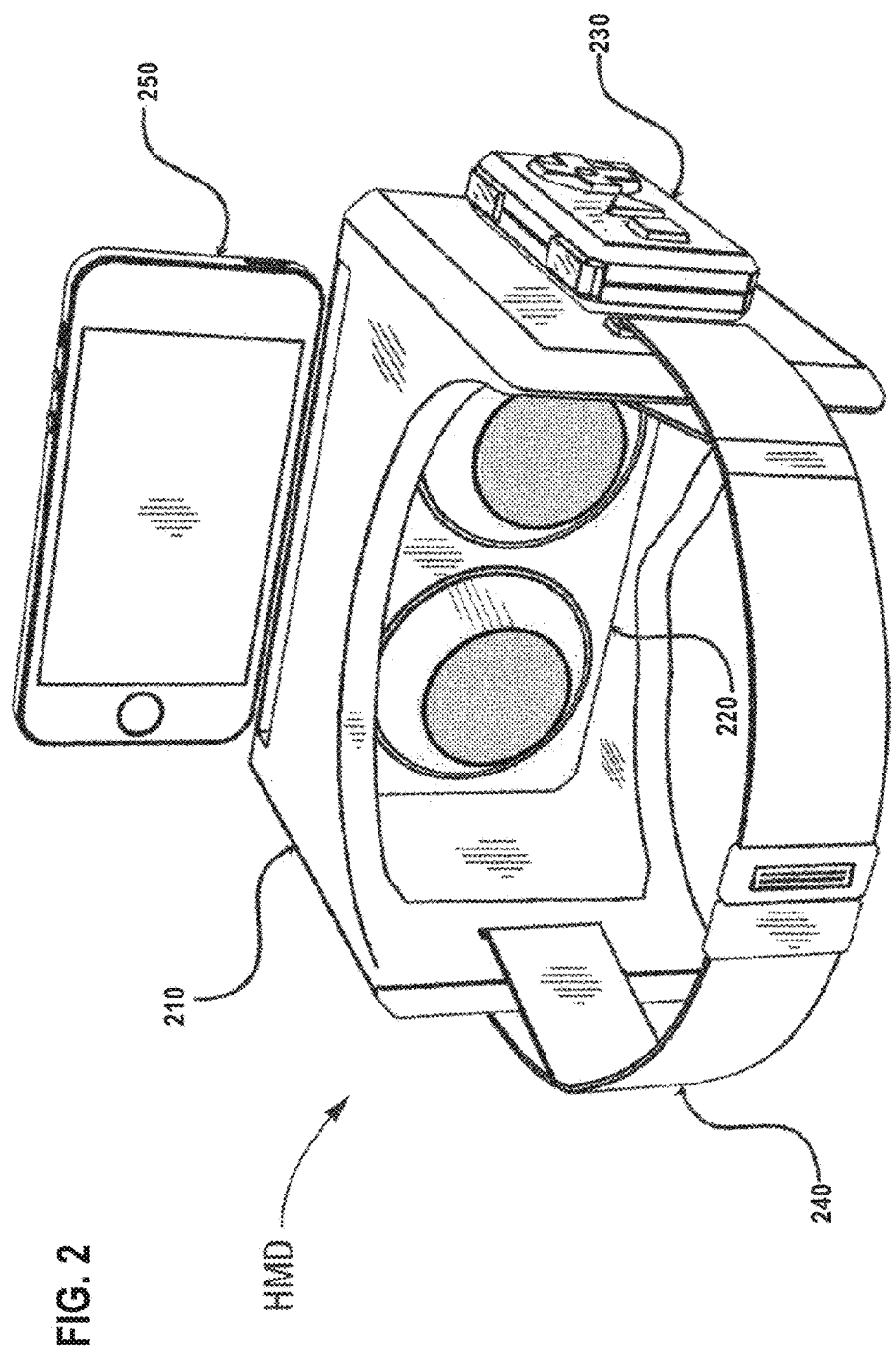
FIG. 2 illustrates an example of a head mounted display for displaying virtual reality applications.

FIG. 2 illustrates an example of a head mounted display for displaying virtual reality applications. While FIG. 2 depicts an example head mounted display which utilizes a smartphone, the systems and methods described herein may also be applied to head mounted displays and other versions of generating virtual reality environments that do not rely on a smartphone device. For example, the methods described herein may be performed using premanufactured head mounted displays, such as the OCULUS RIFT or the HTC VIVE.

The device of FIG. 2 comprises a main body 210 which may be fitted with a lens assembly 220, a strap 240 which securely attaches the main body to the user's a head, a re-attachable remote controller 230, and an external mobile computing device 250 to be secured in the main body. The main body 210 as disclosed herein may be easily adapted to fit any of a number of mobile computing device 250 shapes and sizes, such as, but not limited to, the SAMSUNG GALAXY 4, the IPHONE 5, and the HTC ONE. As noted, strap 240 in FIG. 2 may be used to securely attach the main body to the user's head, but other or additional means and methods may be used. For example, main body 210 could be incorporated into a helmet-like device which is secured to the top a user's head without a strap. The device may also include other means of interacting with the mobile computing device within such as one or more levers coupled to a stylus which is configured to be incident on a touch screen of the mobile computing device or one or more holes in the device through which a user may interact with the mobile computing device.

External mobile computing device 250 may include a central processing unit (CPU), a screen, and wireless communication functionality. External mobile computing device 250 may be capable of running applications for use with the head mounted device. External mobile computing device 250 may incorporate one or more motion sensors, for example, gyroscopes, gravimeters, magnetometers, accelerometers, and similar sensors, which may be relied upon, at least in part, in determining the orientation and movement of the overall head mounted display. In some embodiments, one or more additional sensors are located on main body 210, such as light or pressure sensors which are used to determine whether the head mounted display is being worn by a user.

Lens assembly 220 may be configured to allow three dimensional display through a particular screen. For example, each lens of lens assembly 220 may be configured to focus on a different portion of the mobile computing device screen. The mobile computing device 110 may display a stereoscopic image by displaying a left portion of a stereoscopic image on a left portion of the screen of the mobile computing device 110 and a right portion of the stereoscopic image on a right portion of the screen of the mobile computing device. By displaying slightly different images to each eye, the device allows creation and display of virtual reality, modified reality, 360 degree video, and 3D video.

3. Device Removal Tracking

Figure 3:
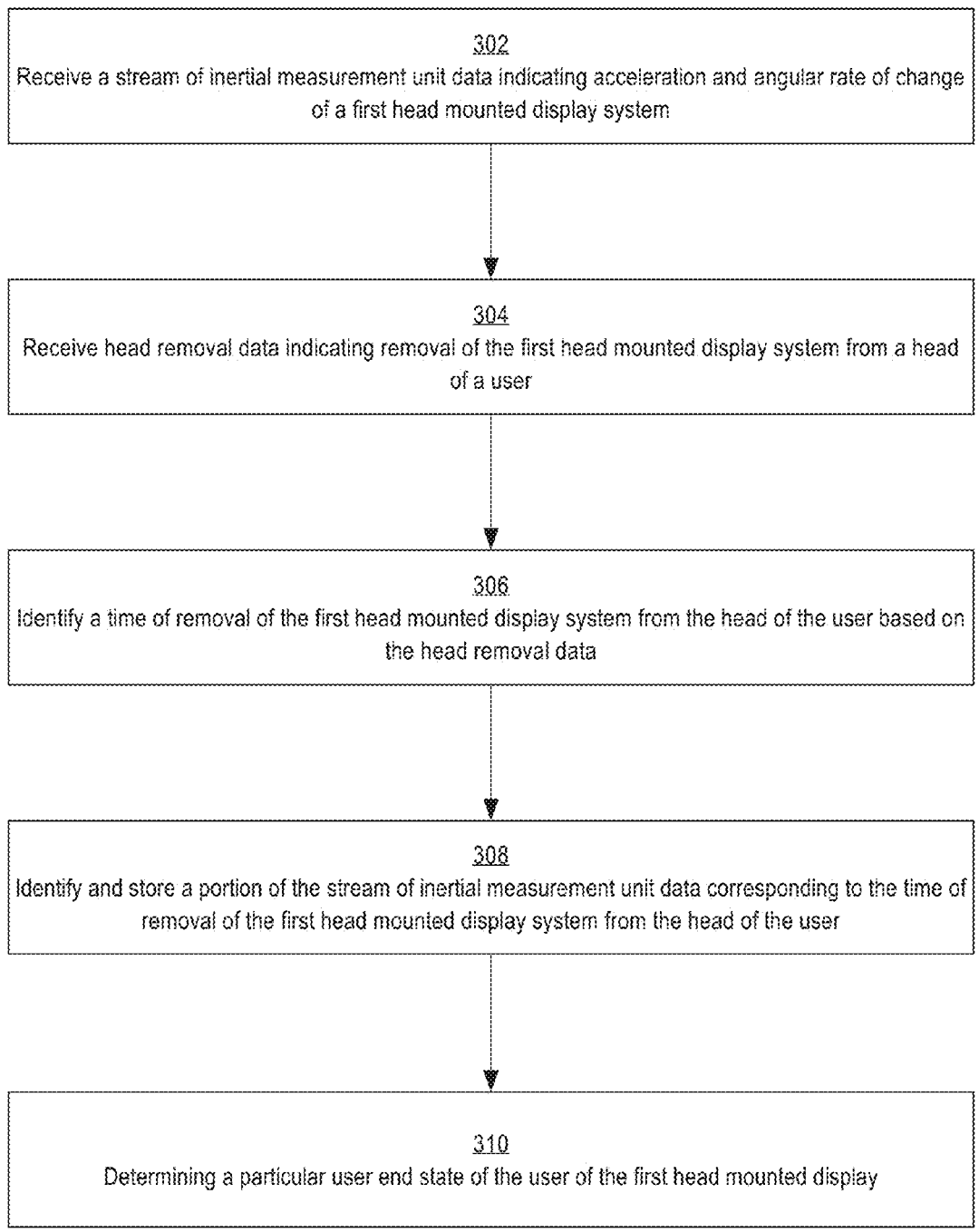
FIG. 3 illustrates a flow diagram illustrating an example method of tracking removal of a client computing device from a head of a user.

FIG. 3 illustrates a flow diagram illustrating an example method of tracking removal of a client computing device from a head of a user. FIG. 3, and each other flow diagram in this disclosure, is intended as an example of a programmable algorithm that may be implemented using one or more of the application publisher computing device(s) 130 and tracking computing device(s) 140 under control of one or more computer programs that are configured to execute the operations that are described in connection with the flow diagrams. The programs may be created using any computer program development environment that is now known or contemplated at the time of this writing, including but not limited to JAVA, C++, OBJECTIVE-C, C, C#, PASCAL, alone or in combination with scripting languages such as PERL, JAVASCRIPT and the like. The programs, alone or in combination, may contain source language instructions, pseudo-code, and/or machine language instructions which when executed cause performing a computer-implemented method comprising:

receiving, from a first head mounted display system comprising an inertial measurement unit and a removal sensor, a stream of inertial measurement unit data indicating acceleration and angular rate of change of the first head mounted display system;

receiving, from the first head mounted display system, head mounted display removal data indicating removal of the first head mounted display system from the head of a user;

identifying a time of removal of the first head mounted display from the head of a user based on the head mounted display removal data;

identifying and storing a portion of the stream of inertial measurement unit data corresponding to the time of removal of the first head mounted display from the head of a user;

based, at least in part, on the stored portion of the inertial measurement unit data, determining a particular end state of a user of the first head mounted display at the time of removal.

receiving, from the first head mounted display system, application state data comprising an identification of a particular virtual reality application executing on the first head mounted display system, an identification of the first head mounted display system, one or more names of metadata attributes associated with the virtual reality application, and one or more metadata values corresponding to the one or more names of metadata attributes;

storing, in database, a record comprising the application state data and one or more of the particular user end state or the inertial measurement unit data.

receiving a search query specifying the particular virtual reality application;

identifying, in the database, a plurality of records, each of which comprising the identification of the particular virtual reality application, one or more user end states, and particular application state data, automatically generating one or more graphs, charts, or statistical reports that correlate, from the plurality of records, the one or more user end states to one or more of the names of metadata attributes.

identifying, in the database, a plurality of records, each of which comprises the identification of the first head mounted display system, instance specific application state data, and an instance specific inertial measurement unit data;

determining the particular user end state based on a differential between the stored portion of the inertial measurement unit data and the instance specific inertial measurement unit data.

receiving a search query specifying the particular virtual reality application;

identifying, in the database, a plurality of records, each of which comprising one or more user end states, and particular application state data, automatically generating one or more graphs, charts, or statistical reports that correlate, from the plurality of records, the one or more user end states to the particular virtual reality application.

receiving, from a plurality of second head mounted display systems, head mounted display removal data and a stream of inertial measurement unit data;

determining a plurality of user end states for the plurality of second head mounted display systems;

receiving a search query specifying the particular virtual reality application;

automatically generating one or more graphs, charts, or statistical reports that correlate, from the plurality of user end states, the one or more user end states to the particular classifying the portion of the stream of inertial measurement unit data as one of easy, medium, or violent based on configurable thresholds;

identifying the end user state based, at least in part, on the classification.

receiving, from the first head mounted display system, disqualifying event data indicating occurrence of a disqualifying event within a particular period of time prior to time of removal of the first head mounted display system from the head of the user;

changing the particular user end state based, at least in part, on the disqualifying event data.

3.1 Head Mounted Display Removal

At step 302, a stream of inertial measurement unit data indicating acceleration and angular rate of change of the head mounted display system is received. For example, client computing device 110 may comprise a head mounted display system and/or may be incorporated into a head mounted display system. The head mounted display system comprises an inertial measurement unit which measures three axis acceleration, three axis angular rate of change, and/or three axis detection of magnetic field. Measurements of three axis acceleration and three axis angular rate of change may be used by virtual reality applications to identify movements of the head for use in the virtual reality application. Thus, a steady stream of measurements of three axis acceleration and three axis angular rate of change may be taken and recorded by the head mounted display system.

In an embodiment, client computing device 110 stores the steady stream of measurements of three axis acceleration and three axis angular rate of change as inertial measurement unit data. The inertial measurement unit data may additionally include a time associated with each measurement. The time associated with each measurement may be recorded from an internal system clock within the head mounted display system, thereby allowing the measurements to be synchronized with head mounted display removal data and application events. In an embodiment, the steady stream of measurement data is only stored for a short duration. For example, the measurements may be stored in a buffer for a particular duration of time. By storing the stream of measurements in a buffer, the head mounted display system is capable of retrieving inertial measurement unit data from before the occurrence of an event. For example, the buffer may store the inertial measurement unit data for five seconds. When the head mounted display system receives an indication of an event which causes the head mounted display system to store inertial measurement unit data, the head mounted display system may retrieve and store the data in the buffer which includes inertial measurement unit data from up to five seconds before the head mounted display system received the indication. In an alternative embodiment, client computing device 110 stores inertial measurement unit data for each instance of a virtual reality application that is run. For example, if the virtual reality application runs for two hours before termination, inertial measurement unit data for the two hours may be stored on client computing device 110.

In an embodiment, client computing device 110 sends inertial measurement unit data to tracking computing device(s) 140. For example, during execution of a particular application, client computing device 110 may send inertial measurement unit data to tracking computing device(s) 140 over one or more networks. Client computing device 110 may send inertial measurement unit data as a steady stream or at discrete intervals. For example, client computing device 110 may send inertial measurement unit data to tracking computing device(s) 140 when the particular application is terminated on client computing device 110. Client computing device 110 may send inertial measurement unit data along with data identifying the head mounted display system and/or the particular application executing on the head mounted display system.

At step 304, head mounted display removal data indicating removal of the first head mounted display from a head of a user is received. For example, the head mounted display system may include one or more sensors that determine when the head mounted display system has been removed from the head of the user. The one or more sensors may be physical pressure sensors and/or light sensors. When the sensors detect that the head mounted display system has been removed from the head of the user, a removal event may be generated on the client computing device indicating removal of the head mounted display system. The removal event may be generated by a software development kit (SDK) executing on the head mounted display system.

At step 306, a time of removal of the first head mounted display from the head of the user is identified based on the head mounted display removal data. For example, when the one or more sensors identify a removal of the head mounted display system from the head of the user, the head mounted display system may identify a time from system clock 120. Additionally and/or alternatively, an SDK executing on the client computing device may cause the client computing device to identify a time from system clock 120 when a head mounted display removal event is received. In an embodiment, the SDK that generates the head mounted display removal event is separate from the SDK that causes identification of a time of head mounted display removal. For example, a head mounted display may be configured with an SDK that generates head mounted display removal events. The particular application executing on the client computing device may be configured with a separate SDK that causes the client computing device to send head mounted display removal data and inertial measurement unit data to tracking computing device(s) 140. The SDK operating through the particular application may also be configured to identify a time when a head mounted display removal event is received.

At step 308, a portion of the stream of inertial measurement unit data corresponding to the time of removal of the first head mounted display system from the head of the user is identified. For example, a stream of inertial measurement unit data starting at the time of removal and ending after a particular period of time may be identified and stored. For example, the particular period of time may be ten seconds after removal of the headset. The particular period of time may be dependent on the inertial measurement unit data. For example, the particular period of time may start at the time of the head mounted display removal and end when the inertial measurement unit data shows that the device has stopped moving. In an embodiment, the portion of the stream of inertial measurement unit data begins before the time of removal. For example, in embodiments where inertial measurement unit data is constantly stored in either a circular buffer or in volatile memory, inertial measurement unit data may be identified starting a few seconds before the time of removal and ending after the particular period of time.

In an embodiment, client computing device 110 initially identifies the portion of the stream of inertial measurement unit data before sending the portion of the stream of inertial measurement unit data to tracking computing device(s) 140. For example, client computing device 110 may continuously store inertial measurement unit data on client computing device 110. In response to identifying the time of removal, client computing device 110 may identify a timestamp in the stream of inertial measurement unit data that matches the time of removal. Additionally and/or alternatively client computing device 110 may store the stream of inertial measurement unit data in a circular buffer. In response to identifying the head mounted display removal, client computing device 110 may transfer the data stored in the circular buffer to more permanent storage or may begin sending the inertial measurement unit data from the circular buffer to tracking computing device(s) 140.

In an embodiment, tracking computing device(s) 140 identifies the portion of the stream of inertial measurement unit data. For example, client computing device 110 may send inertial measurement unit data continuously and/or periodically to tracking computing device(s) 140. Tracking computing device(s) 140 may store the inertial measurement unit data in volatile memory and/or in a circular buffer. When tracking computing device(s) 140 receives head mounted display removal data indicating a time of head mounted display removal, tracking computing device(s) 140 may identify the portion of the stream of inertial measurement unit data directly following the head mounted display removal event and/or starting prior to the head mounted display removal event.

3.2 User End State

At step 310, a particular user end state of the user of the first head mounted display system is determined. In an embodiment, tracking computing device(s) 140 classifies the head mounted display removal based on the inertial measurement unit data. Tracking computing device(s) 140 may store one or more ranges of accelerations and/or speeds of the head mounted display device and correlate the one or more ranges to a classification of head mounted display removal. For example, a range of high accelerations and/or speeds may be classified as a violent head mounted display removal; a range of low accelerations and/or speeds may be classified as an easy head mounted display removal; and a range of accelerations and/or speeds between the violent head mounted display removal and the easy head mounted display removal may be classified as a medium head mounted display removal.

In an embodiment, the classification of head mounted display removal may be based on average values for acceleration of the head mounted display after the head removal event and/or before the head mounted display comes to a stop. Thus, the average values may include acceleration when the head mounted display is initially removed and deceleration when the head mounted display is placed back down. Average acceleration and deceleration values may be stored for each client computing device. When a removal event is detected, tracking computing device(s) 140 may compare current acceleration and/or deceleration values with stored average values for either the individual client computing device or generally for all tracked client computing devices.

As an example of classifying the head mounted display removal based on average acceleration values, tracking computing device(s) 140 may determine an average acceleration at the time of removal of a plurality of head mounted displays and a standard deviation for the acceleration. Tracking computing device(s) 140 may classify head removal events within one standard deviation of the average acceleration "normal." Tracking computing device(s) 140 may classify head removal events below one standard deviation of the average acceleration as "gentle" and head removal events above one standard deviation of the average acceleration as "violent." Tracking computing device(s) 140 may also classify head removal events above two standard deviations of the average acceleration as "very violent."

Tracking computing device(s) 140 may base the classification of the head mounted display on acceleration at the time of removal, deceleration after the removal before the head mounted display comes to a rest, or a combination of the two. For example, tracking computing device(s) 140 may use an average of the initial acceleration and the deceleration when classifying the head mounted display removal event. Additionally and/or alternatively, tracking computing device(s) 140 may use a weighted average of the initial acceleration and the final deceleration with a higher weight on the initial acceleration. In an embodiment, tracking computing device(s) 140 uses average absolute acceleration over time from the initiation of the head removal event to the point in time when the head mounted display comes to a complete rest.

Tracking computing device(s) 140 may use the head mounted display removal classifications to derive a user end state. In an embodiment, the user end state refers to a derived or inferred comfort level for the user of the head mounted display. For example, tracking computing device(s) 140 may correlate a violent head mounted display removal to high levels of discomfort and an easy head mounted display removal to low levels of discomfort. Additionally and/or alternatively, tracking computing device(s) 140 may generate a binary determination of user end state. For example, tracking computing device(s) 140 may identify the end user state as either "uncomfortable" or "not uncomfortable."

In an embodiment, tracking computing device(s) 140 derives the end user state based on differences between a current head mounted display removal event and a prior head mounted display removal event. Tracking computing device(s) 140 may store inertial measurement unit data and/or head mounted display removal classification data along with an identification of a particular user device and/or user account. Tracking computing device may compare the current head mounted display removal event to past head mounted display removal events. If data corresponding to a particular user device indicates that a user consistently removes a head mounted display at high speeds and/or in the violent removal range, tracking computing device(s) 140 may not identify a current violent removal as "uncomfortable" if the range of values is consistent. If data corresponding to a particular user device indicates that the user consistently removes the device at low speeds and/or in the easy removal range, tracking computing device(s) 140 may identify a current medium removal as "uncomfortable" based on the differences between the current removal and the past removals. In an embodiment, classifications of the head mounted display removal event may be device/user specific. For example, tracking computing device(s) 140 may compare past inertial measurement unit data corresponding to a particular user with a current head mounted display removal event to determine if the event should be classified as violent for the particular user, medium for the particular user, or easy for the particular user.

3.3 Additional Data

Tracking computing device(s) 140 may use additional data to determine the end user state. For example, before a particular user exits a particular application, client computing device 110 may display a questionnaire which includes questions related to the user's comfort levels. Responses to the comfort level questions may be sent to tracking computing device(s) 140 along with head mounted display removal data. Using the responses to the comfort level questions and head mounted display removal data, tracking computing device(s) 140 may correlate a comfort level to removal speed for the user of the client computing device. In future executions of applications on client computing device 110 where tracking computing device(s) 140 does not receive direct comfort level inputs, tracking computing device(s) 140 may identify a likely comfort level based on the stored correlations between comfort level and removal speed.

In an embodiment, tracking computing device(s) 140 receives data identifying one or more disqualifying events from client computing device 110. For example, client computing device 110 may identify one or more events that occurred within the application before the application terminated. Client computing device 110 may send data identifying the one or more events with the inertial measurement unit data. The one or more events may be specified by the application publisher. For example, an application publisher may tag a character's death as a disqualifying event. If the character dies within a particular pre-set period of time before the head mounted display removal event, such as ten seconds, a death event may be sent to tracking computing device(s) 140 along with the head mounted display removal event. Based on the death event, tracking computing device(s) 140 may disqualify the head mounted display removal event in identifying the comfort level or comfort data value for the user. By disqualifying head mounted display removal data based on in-application events, tracking computing device(s) 140 may remove other causes of violent head mounted display removals, such as anger at an in-game event.

Additionally and/or alternatively, the methods described herein may be used to identify points of frustration in a virtual reality application in addition to or instead of comfort levels. Similar to disqualifying events, an application publisher may tag particular events within the virtual reality application that may cause frustration to a user of the application. Client computing device 110 may be configured to identify tagged application events and send data identifying tagged application events along with head mounted display removal data. Tracking computing device(s) 140 may then correlate different events to different types of head mounted display removals.

Using the methods described herein, tracking computing device(s) 140 may identify applications and/or events within an application that correlate to more violent head mounted display removals across different client computing devices. For example, tracking computing device may receive head mounted display removal data with event data from a plurality of client computing devices. Tracking computing device(s) 140 may also identify deviations in head mounted display removal speed from average head mounted display removals for each device. Based on the deviations for each client computing device, tracking computing device(s) 140 may determine if a particular application and/or particular event in an application is correlated with more violent than average head mounted display removal events. By comparing head mounted display removals across devices and across applications, tracking computing device(s) 140 may generate and display to a publishing computing device comparisons between head mounted display removals with a particular application associated with the publishing computing device and head mounted display removals with other virtual reality applications.

While embodiments are discussed herein with reference to specific events, client computing device 110 may also identify application state data and send the application state data to tracking computing device(s) 140 along with head mounted display removal data. Application state data generally refers to one or more metadata values associated with a particular application. In an embodiment, application state data is broken down into key value pairs comprising metadata names and metadata values. For example, in a virtual reality application displaying a movie, a key value pair may include the metadata name "Timestamp" and the metadata value may be a value indicating a point in the movie when the head mounted display was removed from the head of the user.

The application state may include the game state of a virtual reality game. A game state may include a location of the digital character in the game, locations of other elements such as characters and movable objects, a level of the game, prior actions taken within the game, current character health, average movement speed, average turn speed, and customizable elements such as character and item skins. The game state may also include session specific data such as how long the current session has been active and what actions have been taken within the current session. Game state data may also include average session data, such as how long on average a game is played on the client computing device and how many different types of actions are taken on average in a game session. For example, average session data may include data identifying how many levels a player generally plays through in a session or how many enemies a player generally defeats during a game session.

In an embodiment, the application publisher selects which types of application state data to send to tracking computing device(s) 140. For example, an application publisher of a driving game may select the g-force around turns as application state data to send to tracking computing device(s) 140. Meanwhile, an application publisher of a first person shooter game may select the number of times a character has been shot recently as application state data to send to tracking computing device(s) 140. By allowing the application publisher to select application state data to send to tracking computing device(s) 140, tracking computing device(s) increases the customizability of the analytics produced. For example, while general game state data may be useful in determining whether a distraction occurs in relationship to an amount of time an application has been running, specified game state data can be used to determine which events that are specific to the particular game lead to a distraction.

3.4 Implementation Examples

Figure 4:
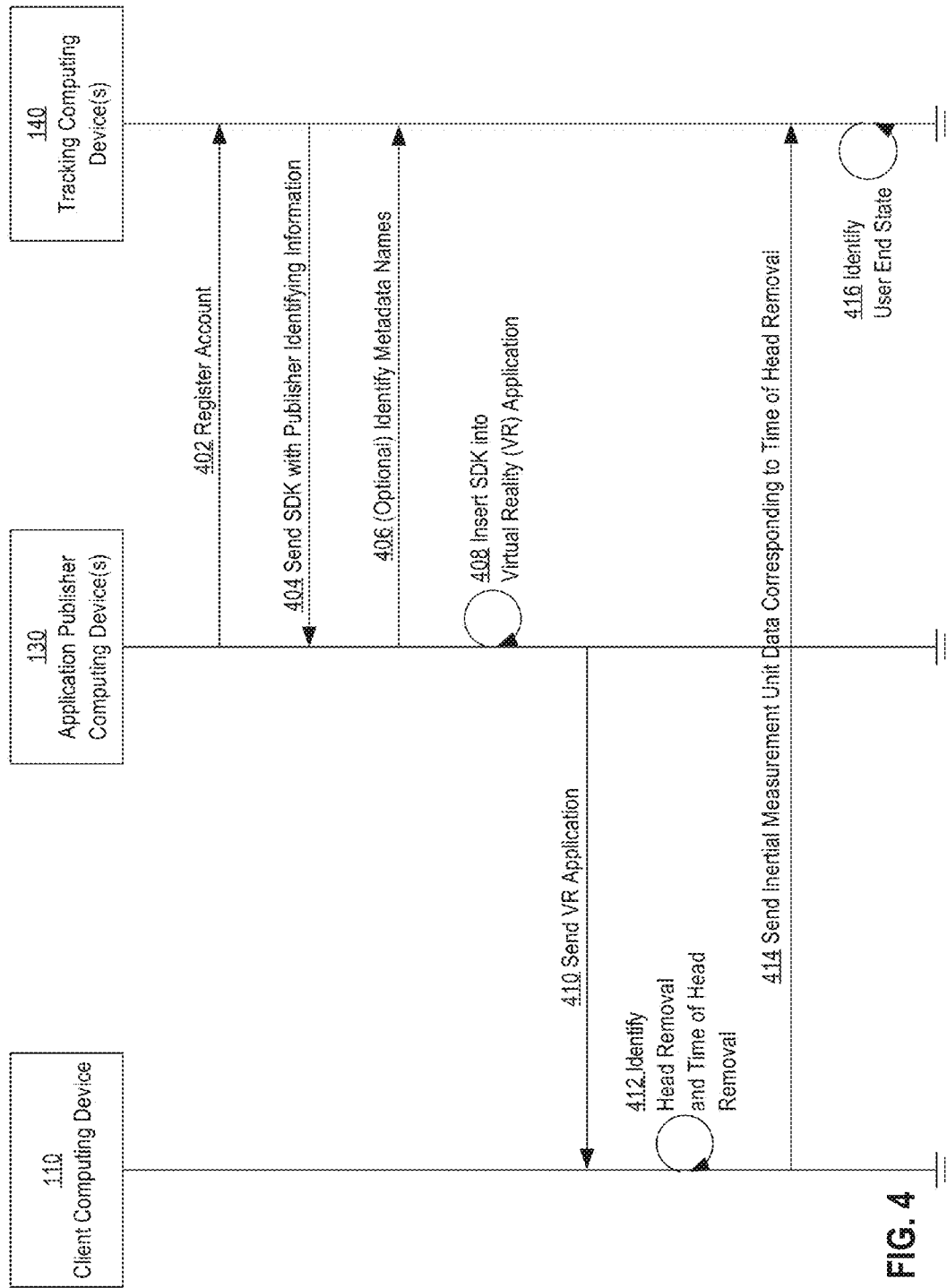
FIG. 4 illustrates a flow diagram illustrating an example method of tracking removal of a client computing device from a head of a user.

FIG. 4 illustrates a flow diagram illustrating an example method of tracking removal of a client computing device from the head of a user.

At step 402, application publisher computing device(s) 130 registers an account with tracking computing device(s) 140. For example, an application publisher may generate a user account with tracking computing device(s) 140 through an application or website provided by tracking computing device(s) 140.

At step 404, tracking computing device(s) 140 sends a software development kit with publisher identifying information, such as an application ID and placement ID, to application publisher computing device(s) 130. The software development kit (SDK) may include executable code to be inserted into a virtual reality application along with the application ID and placement ID. In an embodiment, the application SDK includes one or more plug-ins to an SDK executing on the client computing device. The application SDK may make calls to the SDK executing on the client computing device to cause the client computing device to send inertial measurement unit data and head mounted display removal data to tracking computing device(s) 140. In an embodiment, the application SDK includes tools for identifying metadata names and values to be obtained and sent to tracking computing device(s) 140 in response to a head mounted display removal event.

At step 406, application publisher computing device(s) optionally identifies metadata names to tracking computing device(s) 140. For example, tracking computing device(s) 140 may generate a user interface for identifying one or more names of metadata values to be associated with inertial measurement unit data from the time of head mounted display removal. Metadata values may include occurrence of particular events within a particular period of time before the head mounted display removal event, values identifying a state of the virtual reality application at the time of head mounted display removal, and/or inertial measurement unit values during execution of the particular virtual reality application such as average device acceleration and/or surge.

At step 408, application publisher computing device(s) inserts the SDK into a particular virtual reality application. For example, application publisher computing device(s) 130 may insert, into a particular application, a virtual reality tracking library generated by tracking computing device(s) 140. The virtual reality tracking library may be an SDK configured to track inertial measurement unit data, receive head mounted display removal events, identify metadata values from the virtual reality application, and send data to tracking computing device(s) 140. In an embodiment, the SDK causes inertial measurement unit data to be stored on client computing device 110 and sent to tracking computing device(s) 140 in batches.

At step 410, application publisher computing device(s) 130 sends the VR application to client computing device 110. Sending the VR application to client computing device 110 may comprise placing the application on a platform application store, such as a marketplace application, for download onto client computing device 110. The VR application may include instructions for sending data to tracking computing device(s) 140 to be associated with a particular placement ID and application ID. The VR application may further include instructions for identifying a state of the application and sending the application state data to tracking computing device(s) 140 with the tracking data associated with the particular placement ID and application ID.

At step 412, client computing device 110 identifies a head mounted display removal and a time of head mounted display removal. For example, client computing device 110 may be configured to generate a head mounted display removal event when one or more sensors on the client computing device detect that the device has been removed from the head of a user. The SDK in the particular application may cause the application to request access to inertial measurement unit data and head mounted display removal data from client computing device 110. When client computing device 110 generates a head mounted display removal event, data indicating the head mounted display removal event may be identified to the particular application. The SDK in the particular application may also be configured to make calls to a system clock of client computing device 110 when a head mounted display removal event is received in order to determine a time of removal.

At step 414, client computing device 110 sends inertial measurement unit data corresponding to the time of head mounted display removal to tracking computing device(s) 140. For example, the SDK in the particular application may cause client computing device 110 to constantly send a stream of inertial measurement unit data to tracking computing device(s) 140 during execution of the particular application. When a head mounted display removal event is received, client computing device 110 may send data to tracking computing device(s) 140 indicating the head mounted display removal and the time of head mounted display removal to be associated with the inertial measurement unit data. Additionally and/or alternatively, the SDK in the particular application may cause client computing device 110 to identify the head mounted display removal event and, in response to identifying the head mounted display removal event, send inertial measurement unit data to tracking computing device(s) 140. Inertial measurement unit data sent to tracking computing device(s) 140 using this approach may include inertial measurement unit data from before the head mounted display removal event in situations where such data is available, such as when inertial measurement unit data is stored in volatile memory or in a circular buffer on client computing device 110.

At step 416, tracking computing device(s) 140 identifies a user end state. For example, tracking computing device(s) 140 may classify the head mounted display removal as easy, medium, or violent based, at least in part, on the inertial measurement unit data. Additionally and/or alternatively, tracking computing device(s) 140 may infer comfort level or comfort data values, and/or frustrations from inertial measurement unit data and/or classifications of head mounted display removal events.

3.5 Analytics Processing

The process of FIG. 3, FIG. 4 may be repeated any number of times by tracking computing device(s) 140 across multiple applications executing on a single client computing device, across multiple instances of the particular application executing on multiple different client computing devices, and/or across multiple applications executing on multiple client computing devices. Over time, tracking computing device(s) may be a set of records, including thousands or millions, which indicate speed of removal of head mounted display systems and comfort level of different users in the same VR experience and different VR experiences upon termination of the VR application. Based on this data, application publisher computing device(s) 130 can acquire powerful analytical data about the effect that the particular application is having on users, individually or in the aggregate.

Tracking computing device(s) 140 may provide statistical reports to application publisher computing device(s) 130. The statistical reports can indicate differences between the particular application and different applications, such as differences in head mounted display removal speed and execution time of the applications. Statistical reports may also identify average length of time of application execution before removal of head mounted display systems and average speeds of head mounted display removal generally and/or in connection to length of time of application execution.

Additionally, statistical reports may correlate one or more metadata values with head mounted display removal events. A report may provide a summary of metadata values for all users or client computing devices 110 for specific metadata values, such as particular length of time of application execution or particular events that occurred in the application before removal. Metadata values may be reported as mean values, arithmetic averages, and a range within one standard deviation from the mean, etc.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
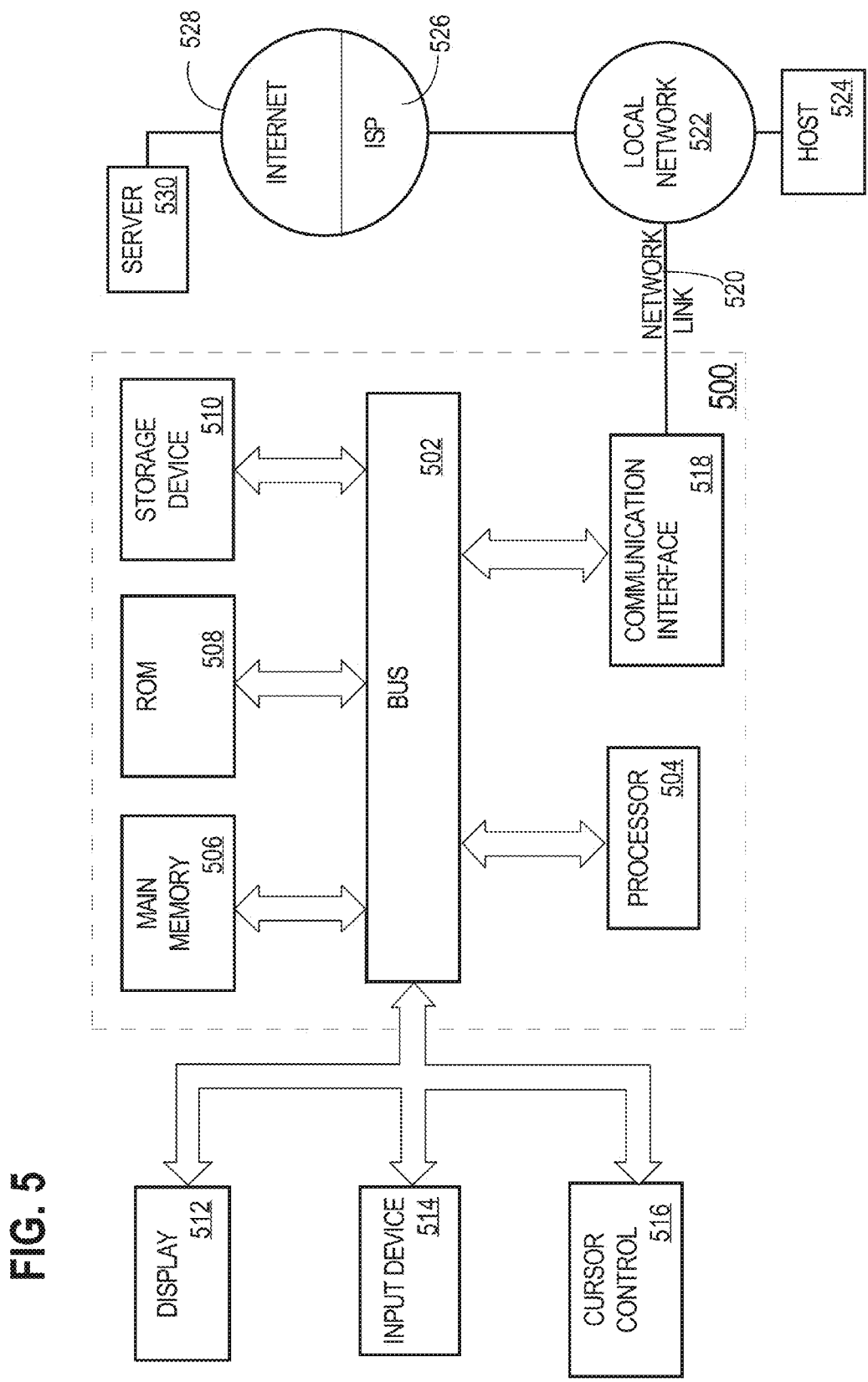
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
   receiving, from a first head mounted display system comprising an inertial measurement unit and a removal sensor, a stream of inertial measurement unit data indicating acceleration and angular rate of change of the first head mounted display system;
   receiving, from the first head mounted display system, head mounted display removal data indicating removal of the first head mounted display system from a head of a user;
   identifying a time of removal of the first head mounted display from the head of the user based on the head mounted display removal data;
   identifying and storing a portion of the stream of inertial measurement unit data corresponding to the time of removal of the first head mounted display from the head of the user;
   based, at least in part, on the stored portion of the inertial measurement unit data, determining a particular end state of the user of the first head mounted display at the time of removal by comparing the stored portion of the inertial measurement unit data to stored correlations between inertial values and end state classifications.

2. The computer-implemented method of claim 1, further comprising:
   receiving, from the first head mounted display system, application state data comprising an identification of a particular virtual reality application executing on the first head mounted display system, an identification of the first head mounted display system, one or more names of metadata attributes associated with the virtual reality application, and one or more metadata values corresponding to the one or more names of metadata attributes;
   storing, in database, a record comprising the application state data and one or more of the particular end state or the inertial measurement unit data.

3. The computer-implemented method of claim 2, further comprising:
   receiving a search query specifying the particular virtual reality application;
   identifying, in the database, a plurality of records, each of which comprising the identification of the particular virtual reality application, one or more end states, and particular application state data,
   automatically generating one or more graphs, charts, or statistical reports that correlate, from the plurality of records, the one or more end states to one or more of the names of metadata attributes.

4. The computer-implemented method of claim 2, further comprising:
identifying, in the database, a plurality of records, each of which comprises the identification of the first head mounted display system, instance specific application state data, and an instance specific inertial measurement unit data;
determining the particular end state based on a differential between the stored portion of the inertial measurement unit data and the instance specific inertial measurement unit data.

5. The computer-implemented method of claim 2, further comprising:
receiving a search query specifying the particular virtual reality application;
identifying, in the database, a plurality of records, each of which comprising one or more end states, and particular application state data,
automatically generating one or more graphs, charts, or statistical reports that correlate, from the plurality of records, the one or more end states to the particular virtual reality application.

6. The computer-implemented method of claim 1, further comprising:
receiving, from a plurality of second head mounted display systems, head mounted display removal data and a stream of inertial measurement unit data corresponding to a particular virtual reality application;
determining a plurality of end states for the plurality of second head mounted display systems;
receiving a search query specifying the particular virtual reality application;
automatically generating one or more graphs, charts, or statistical reports that correlate, from the plurality of end states, the one or more end states to the particular virtual reality application.

7. The computer-implemented method of claim 1, further comprising:
classifying the portion of the stream of inertial measurement unit data as one of easy, medium, or violent;
identifying the particular end state based, at least in part, on the classification.

8. The computer-implemented method of claim 1, further comprising:
receiving, from the first head mounted display system, disqualifying event data indicating occurrence of a disqualifying event within a particular period of time prior to time of removal of the first head mounted display system from the head of the user;
changing the particular end state based, at least in part, on the disqualifying event data.

9. A system comprising:
a memory;
one or more processors communicatively coupled to the memory and configured to:
receive, from a first head mounted display system comprising an inertial measurement unit and a removal sensor, a stream of inertial measurement unit data indicating acceleration and angular rate of change of the first head mounted display system;
receive, from the first head mounted display system, head mounted display removal data indicating removal of the first head mounted display system from a head of a user;
identify a time of removal of the first head mounted display from the head of the user based on the head mounted display removal data;
identify and storing a portion of the stream of inertial measurement unit data corresponding to the time of removal of the first head mounted display from the head of the user;
based, at least in part, on the stored portion of the inertial measurement unit data, determine a particular end state of the user of the first head mounted display at the time of removal by comparing the stored portion of the inertial measurement unit data to stored correlations between inertial values and end state classifications.

10. The system of claim 9, wherein the one or more processors are further configured to:
receive, from the first head mounted display system, application state data comprising an identification of a particular virtual reality application executing on the first head mounted display system, an identification of the first head mounted display system, one or more names of metadata attributes associated with the virtual reality application, and one or more metadata values corresponding to the one or more names of metadata attributes;
store, in database, a record comprising the application state data and one or more of the particular end state or the inertial measurement unit data.

11. The system of claim 10, wherein the one or more processors are further configured to:
receive a search query specifying the particular virtual reality application;
identify, in the database, a plurality of records, each of which comprising the identification of the particular virtual reality application, one or more end states, and particular application state data,
automatically generate one or more graphs, charts, or statistical reports that correlate, from the plurality of records, the one or more end states to one or more of the names of metadata attributes.

12. The system of claim 10, wherein the one or more processors are further configured to:
identify, in the database, a plurality of records, each of which comprises the identification of the first head mounted display system, instance specific application state data, and an instance specific inertial measurement unit data;
determine the particular end state based on a differential between the stored portion of the inertial measurement unit data and the instance specific inertial measurement unit data.

13. The system of claim 10, wherein the one or more processors are further configured to:
receive a search query specifying the particular virtual reality application;
identify, in the database, a plurality of records, each of which comprising one or more end states, and particular application state data,
automatically generate one or more graphs, charts, or statistical reports that correlate, from the plurality of records, the one or more end states to the particular virtual reality application.

14. The system of claim 9, wherein the one or more processors are further configured to:
receive, from a plurality of second head mounted display systems, head mounted display removal data and a stream of inertial measurement unit data corresponding to a particular virtual reality application;

determine a plurality of end states for the plurality of second head mounted display systems;

receive a search query specifying the particular virtual reality application;

automatically generate one or more graphs, charts, or statistical reports that correlate, from the plurality of end states, the one or more end states to the particular virtual reality application.

15. The system of claim 9, wherein the one or more processors are further configured to:

classify the portion of the stream of inertial measurement unit data as one of easy, medium, or violent;

identify the particular end state based, at least in part, on the classification.

16. The system of claim 9, wherein the one or more processors are further configured to:

receive, from the first head mounted display system, disqualifying event data indicating occurrence of a disqualifying event within a particular period of time prior to time of removal of the first head mounted display system from the head of the user;

change the particular end state based, at least in part, on the disqualifying event data.

* * * * *